United States Patent
Hillen et al.

(10) Patent No.: US 9,667,483 B2
(45) Date of Patent: May 30, 2017

(54) METHOD, GATEWAY DEVICE AND NETWORK SYSTEM FOR CONFIGURING A DEVICE IN A LOCAL AREA NETWORK

(75) Inventors: Bernardus Hillen, Zoetermeer (NL); Igor Passchier, The Hague (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 157 days.

(21) Appl. No.: 13/996,181

(22) PCT Filed: Dec. 22, 2011

(86) PCT No.: PCT/EP2011/073842
§ 371 (c)(1),
(2), (4) Date: Jun. 20, 2013

(87) PCT Pub. No.: WO2012/085232
PCT Pub. Date: Jun. 28, 2012

(65) Prior Publication Data
US 2013/0265910 A1    Oct. 10, 2013

(30) Foreign Application Priority Data
Dec. 23, 2010    (EP) .................................... 10196748

(51) Int. Cl.
*H04L 12/24*    (2006.01)
*H04L 29/12*    (2006.01)

(52) U.S. Cl.
CPC ...... *H04L 41/0806* (2013.01); *H04L 41/0893* (2013.01); *H04L 29/12226* (2013.01); *H04L 61/2015* (2013.01)

(58) Field of Classification Search
CPC ......... H04L 63/20; H04L 63/18; H04L 63/12; H04L 63/04; H04L 63/08; H04L 63/10;
(Continued)

(56) References Cited

U.S. PATENT DOCUMENTS 6,553,498 B1 * 4/2003 Elgressy et al. ................ 726/23
6,769,118 B2 * 7/2004 Garrison et al. .............. 717/177
(Continued)

OTHER PUBLICATIONS

Rigney et la. "RFC 2865: Remote Authentication Dial in User Service (RADIUS)" by IETF Jun. 2000.*
(Continued)

*Primary Examiner* — Wutchung Chu
(74) *Attorney, Agent, or Firm* — McDonnell Boehnen Hulbert & Berghoff LLP

(57) ABSTRACT

The invention relates to a method for configuring a device in a local area network using a gateway. The gateway is being communicatively coupled to a remote management server outside the local area network. The local area network comprises a protected portion and an unprotected portion. The method comprises the following actions: First a connection request is received from a user device. The user device is provided with an address that enables the user device to establish a connection with the gateway within the unprotected portion of the local area network. Then a configuration request is received from the user device, in which the configuration request includes device information. Network information is appended to the configuration request and the appended configuration request is sent to the remote management server. In response a configuration response message is received. The response message includes the configuration data from the remote management server. Finally, configuration of the user device is established within the protected portion of the local area network using the configuration data.

13 Claims, 2 Drawing Sheets

(58) Field of Classification Search
CPC ............. H04L 63/1408; H04L 63/0227; H04L 63/101; H04L 41/024; H04L 41/0806; H04L 61/25; H04L 63/104; H04L 63/06; H04L 2463/101; H04W 12/06; G06F 2221/0706; G06F 21/53; G06F 21/577; G06F 2009/45587; G06F 2221/2141
USPC ................ 726/1, 3, 5, 27–29; 370/401, 252; 709/203, 223–225, 229
See application file for complete search history.

(56) References Cited

U.S. PATENT DOCUMENTS

| | | | |
|---|---|---|---|
| 8,761,396 B2* | 6/2014 | Little | H04L 12/5835 380/247 |
| 8,943,570 B1* | 1/2015 | Kalbag | H04L 63/0815 709/225 |
| 2002/0136226 A1* | 9/2002 | Christoffel | H04L 63/0428 370/401 |
| 2003/0055968 A1* | 3/2003 | Hochmuth et al. | 709/226 |
| 2003/0087629 A1* | 5/2003 | Juitt | H04L 1/22 455/411 |
| 2003/0217148 A1* | 11/2003 | Mullen et al. | 709/225 |
| 2004/0107360 A1* | 6/2004 | Herrmann | H04L 63/08 726/1 |
| 2005/0132060 A1* | 6/2005 | Mo | H04L 51/12 709/227 |
| 2006/0203815 A1* | 9/2006 | Couillard | H04L 12/4641 370/389 |
| 2009/0238474 A1* | 9/2009 | Sandberg | G06K 9/723 382/229 |
| 2010/0064032 A1* | 3/2010 | Vinel et al. | 709/220 |
| 2010/0205657 A1* | 8/2010 | Manring | G06F 21/566 726/5 |
| 2010/0218248 A1* | 8/2010 | Nice et al. | 726/12 |
| 2011/0013637 A1* | 1/2011 | Xue | H04L 12/4679 370/395.5 |
| 2011/0170554 A1* | 7/2011 | De Smedt | H04L 12/5692 370/401 |

OTHER PUBLICATIONS

Thaler et al., IEEE 802.1Q, Media Access Control Bridges and Virtual Bridged Local Area Networks, Mar. 10, 2013, 77 pages.
PCT International Search Report and Written Opinion, PCT International Application No. PCT/EP2011/073842 dated May 9, 2012.
Bernstein, Jeff et al., "CPE WAN Management Protocol", Technical Report, DSL Forum TR-069, May 2004, pp. 1-109.
European Search Report, European Patent Application No. 10196748.7 dated Jun. 1, 2011.

* cited by examiner

METHOD, GATEWAY DEVICE AND NETWORK SYSTEM FOR CONFIGURING A DEVICE IN A LOCAL AREA NETWORK

CROSS REFERENCE TO RELATED APPLICATIONS

The present application is a national stage entry of PCT/EP2011/073842, filed Dec. 22, 2011, and claims priority to EP 10196748.7, filed Dec. 23, 2010. The full disclosures of EP 10196748.7 and PCT/EP2011/073842 are incorporated herein by reference.

BACKGROUND OF THE INVENTION

Field of the Invention

The present invention generally relates to a method for configuring a device in a local area network, a LAN, using a gateway. The invention further relates to a computer readable medium for performing, when executed by a processor, such method. The invention further relates to a gateway device for configuring a user device in a local area network. Finally the invention relates to a network system including such device.

Description of the Related Art

Configuration of a local area network, a LAN, is known in the art. LANs are used in both domestic and commercial environments, and various methods are known in the art to enable devices to operate within and across such networks. For example, US 2006/0203815 describes a method and system for verifying compliance of a device wishing to access a corporate network from outside the network, in which compliance verification is performed by installing an agent software on the device, detecting boot-up of the device, providing the device with a temporary IP address within a compliance network which is logically separate from the corporate network, verifying the device for each of a list of compliance rules and transmitting the result for each rule, deciding on compliance based on the transmitted results and if the device is compliant instructing a switch port at OSI layer 2 to connect the device to the corporate network, otherwise switching the device to a logically separate network.

Nowadays network devices may be obtained by consumers in general stores. Generally, these network devices need some service from a provider across the network. Installing such service onto the device within a home network of the consumer may not be a problem if the service provider is identical to the internet service provider of the respective consumer. However, configuration of such device becomes more difficult, if not impossible, if the provider of the service is different from the internet service provider.

It is desirable to be able to automatically connect and configure an off-the-shelf bought networked device within a home network so that the device is fully operational. Preferably, the result is that the device can perform all services it is designed to do without being bound by network barriers.

BRIEF SUMMARY OF THE INVENTION

For this purpose, the present invention provides a method for configuring a device in a local area network using a gateway, the gateway being communicatively coupled to a remote management server outside the local area network, the local area network comprising a protected portion and an unprotected portion, the method comprising the following actions: receiving a connection request from a user device; providing an address to the user device, the address enabling the user device to establish a connection with the gateway within the unprotected portion of the local area network; receiving a configuration request from the user device, the configuration request including device information; appending network information to the configuration request and sending the appended configuration request to the remote management server; receiving a configuration response message including the configuration data from the remote management server; and establishing configuration of the user device within the protected portion of the local area network on the basis of the configuration data. Some embodiments of the invention relate to a computer readable medium for performing, when executed by a processor, the method as mentioned above.

Some embodiments of the invention relate to a gateway device for configuring a user device in a local area network, a LAN, comprising a processor and at least one memory connected to the processor, wherein the device is arranged for communicative coupling to a remote management server outside the local area network, and wherein the device is in addition arranged for performing, in use, the method as mentioned above. The term gateway device means a device or node between two different types of network, typically as is the case in what is known as a home gateway HG, or residential gateway RG, between a LAN and Wide Area Network, a WAN, where the LAN is a localized network set up to link together home PCs and other domestic computing devices or electronically connectable domestic devices, for example those concerned with energy management or security, and the WAN is for example the wider internet. In general residential gateways include a router to enable IP addressability to devices in the home network and also include modem functionality.

Finally, some embodiments of the invention relate to a network system for configuring a user device comprising a local area network, a wide area network, and a gateway device for providing an interface between the local area network and the wide area network WAN, the local area network further comprising the user device to be configured, and the wide area network WAN comprising an remote management server, ACS, for providing configuration data to the gateway; wherein the gateway device RG is a gateway device as mentioned above. As is known by the skilled person, an auto-configuration server, or ACS, performs configuration of home gateways and other customer premises equipment, CPE, for example using a standardized protocol as is known in the art such as TR-069.

It will be evident that the presently invented principle may be put into practice in various ways.

BRIEF DESCRIPTION OF THE DRAWINGS

Various aspects of the invention will be further explained with reference to embodiments shown in the drawings wherein.

DESCRIPTION OF ILLUSTRATIVE EMBODIMENTS

The following is a description of various embodiments of the invention, given by way of example only and with reference to the drawings.

Figure 1:
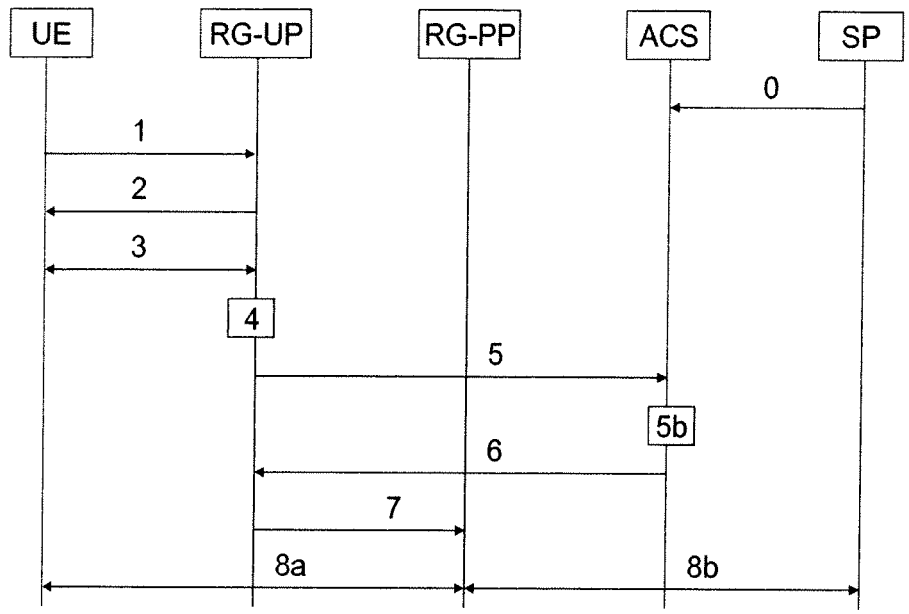
FIG. 1 schematically shows a signal flow of a method for configuring a user device within a local area network according to an embodiment of the invention.

FIG. 1 schematically shows a signal flow of a method for configuring a user device within a local area network according to an embodiment of the invention. The local area network is managed by a gateway, further referred to as home gateway or residential gateway RG. The local area network can be divided in two portions, a protected portion (PP) and an unprotected portion (UP). The protected portion is restricted for only specific use by one or more different user, usually understood by the skilled person as represented by different devices. Protection may be achieved by using a known network technology, such as VLAN (Virtual Local Area Network)-technology, for example as defined by IEEE 802.1Q in which a physical network is logically divided into two or more networks and wherein devices can be configured for access to a specific one such network or VLAN. Alternatively, protection may be achieved by physical separation. Examples of a protected portion include a secured network domain and a QoS (Quality of Service) enabled domain. As is known by the skilled person QoS in telecommunications involves parameters such as, for example, bandwidth, priority, delay, delay variations and packet loss. The unprotected portion is fully open for communication of devices connected with the residential gateway. An example of an unprotected portion includes a network domain sometimes referred to as de-militarized zone (DMZ) as is known in the art.

The residential gateway RG is communicatively coupled to a remote management server outside the local area network, in the embodiment shown in FIG. 1 an auto-configuration server ACS. Hereafter the remote management server will be referred to as server ACS. The server ACS is able to configure the residential gateway RG. The server ACS is loaded with, or has access to, configuration data for a plurality of user devices. In addition, the server ACS is aware of the users that are allowed to operate within the protected portion of the local area network managed by the gateway RG. Furthermore, the server ACS is aware of the services to which the allowed users are subscribed and/or admitted.

The signal flow of the method in FIG. 1 starts with connecting a user device UE to the local area network by a user. The newly connected user device broadcasts a discovery message, further referred to as connection request to the gateway RG in action 1. In response to the receipt of the connection request from the user device, the gateway RG provides an address to the user device in action 2. Providing the address can be done by using a known protocol such as DHCP (Dynamic Host Configuration Protocol). The address may take the form of an IP-address (Internet Protocol). Having an address enables the user device to establish a connection with the gateway RG within the unprotected portion of the local area network. Communication over the established connection may be performed by means of a standardized protocol such as UPnP (Universal Plug and Play). Via the established connection, the device UE then sends a configuration request to the RG. The combination of establishing a connection and sending a configuration request is schematically denoted as action 3 in FIG. 1. The configuration request includes device information which identifies for the ACS the type of device that is requesting configuration data. The device information can be used to unambiguously link the device to the user of the device. This may be done by, for example, including device information which is representative of the device type. In a particularly simple embodiment the device type information may be provided in the form of a relevant part of the MAC-address (Medium Access Control) of the device UE. The MAC-address may be assigned to a specific user which enables a link between device and user. Alternatively, or additionally, the device information may include identification information such as a license code, assigned to the device UE. The license code may correspond to a license in name of a certain user, which establishes a link between device and user.

The gateway RG then appends network information to the received configuration request in action 4, and sends the appended configuration request to the server ACS in action 5. The connection between gateway RG and server ACS may be performed by means of a standardized protocol such as TR-069. Appending the network information is based on analysis of the device information, and linking the device information to information available within the network. For example, the gateway RG may link the device on the basis of the device information to a specific user. The network information appended to the configuration request may then include the user information of the identified user.

In response, the server ACS sends in action 6 the configuration data on the basis of the device information and the network information, for example device type and user identification. The configuration data at least comprises data for establishing a network configuration within the protected network portion of the local area network for the user device UE. In addition, the configuration data may further include one or more of software configuration data and identification data. The software configuration data enable the provisioning of suitable software within the local area network for performing a specific device-related service. After a software configuration the device UE can use this software to run a specific service. Identification data, such as a license code, may be useful to allow for enabling local reconnection of the device, as well as for connection of the device while it is roaming in different local area networks as will be explained with reference to FIG. 4.

The gateway RG then performs a network configuration including adding the device UE to devices that can operate within the protected portion of the local area network in action 7 and establishing a connection between the user device UE and the gateway RG within the protected portion of the local area network in action 8a. The result of actions 7 and 8a is that the device is now fully part of the protected portion of the local area network.

Configuration of the gateway RG may be performed via the connection using a standardized protocol such as TR-069. Establishing a connection between the user device UE and the gateway RG involves configuration of the device UE. Communication over the connection between the user device UE and the gateway RG to establish the device configuration may be done using a standardized protocol, for example UPnP.

After completion of the network configuration, the connection between the user device UE and the gateway RG within the unprotected portion of the local area network may be terminated. By terminating this connection, which is now replaced by a similar connection within the protected portion of the network, additional resources are made available.

After completion of the network configuration, also additional configuration actions may be executed. For example, the gateway RG may perform a software configuration based on software configuration data received from the server ACS in action 6. In another example, the gateway RG provides license data to the device UE, which license data may be obtained from the server ACS in action 6 as well.

The use of the method shown in FIG. 1 enables an automatic configuration in a local area network, such as a home network, without excessive input, if any, of the user. Furthermore, the method allows for the automatic configuration of other aspects of the device, such as a configuration of service related software suitable for use by the device and/or a registry of license data associated with the device. As a result, the device may be able to use managed services, for example a service that ensures a minimal predetermined quality of service or a service that involves the ability to use a certain security protocol.

As described above, the server ACS may send software configuration data to the gateway in action 6. However, it is also possible that such data are sent after establishment of the connection between the device UE and the gateway RG within the protected portion of the network. The software configuration data may be automatically provided by the server ACS if the server is provisioned for a service that can run on the device UE. For example, if a software update becomes available, the server ACS may send updated software configuration data to the gateway RG for further software configuration. As a result, a user does not have to keep track of software updates, while the invention allows the device to function in an up-to-date fashion. Alternatively, software configuration data may be sent by the ACS to the gateway RG in response to a service request originating from the device UE. For example, if a user subscribes to a service that may be executed by a device UE that is already configured within the protected portion of the network, services may be provided in this way. Software configuration after establishing the connection within the protected portion of the local area network enables a configuration that can only be influenced by the person or entity that has the rights within the protected portion to do so. Third parties that have no access to the protected portion are unable to influence the software configuration.

Similarly, it is also possible that the ACS provides identification data, such as a license code, after the connection between gateway RG and the device UE is established within the protected portion of the local area network. For example, if a license agreement between a service provider and a user of the device UE is updated, which results in a different license code, this license code may be provided.

As follows from the above, the method provides a very versatile and flexible way of configuring a device within a protected portion of a local area network without excessive input from a user of the device. In addition, the invention makes it possible for an ACS to manage a particular portion of the RG in the event that a user utilizes the service provided by the ACS. This in addition has the advantage that a service provided by an ACS external to the residential network, the LAN, can be controlled and operated effectively from outside the LAN without any need for the user to perform a complicated set up or ongoing control. Additionally, because the ACS manages its own particular protected portion of the RG, in other words provides a managed service, guaranteeing security, quality of service and promised performance, the invention allows multiple ACSs to manage their own, separate, services on a single RG without interfering with each other.

In a further embodiment of the invention, once the user device has been configured in the protected portion of the gateway RG it can interact with a service provider SP as is also shown in FIG. 1. A device, for example, can get a connection to a service via a Uniform Resource Locator, a URL, or for example via an IP address. The URL, IP address, or alternative as is known in the art, can be provided as part of the configuration in action 6, described above. The further embodiment described here includes steps 0 and 8b.

As shown in additional step 0 the Service Provider, for example using an application server, informs the ACS, either directly or through some intermediate means, of a user that will use some kind of service in the near future. For example, if a health care provider determines that a user needs, or will be advised to acquire, or will be allocated, a heart monitor or an alarm button, it will indicate to the ACS that this specific user will connect a UE with that specific type, in other words a 'heart monitor' or 'alarm button'. The Service Provider can indicate this in various means and it is likely that this occurs in a completely automated manner using for example an interface offered by the ACS. However it is also possible that the Service Provider indicates this manually or otherwise off-line by, for example, placing a phone call from the service provider to the ACS provider with the result that a manual configuration occurs of the information in the ACS, the manual configuration undertaken internally by the provider of the ACS.

After step 0 is performed, the original steps 1 through 8a are carried out as described above. After step 5, as indicated by box 5b, the ACS can determine the configuration needed by the RG and UE, based on the information acquired in step 0, in combination with the user identity that is derived from the message 5. For example, the ACS provider knows that the user indicated by the Service Provider is living at a certain address and is using a certain RG. More users might be in the same household, using the same RG, but it is assumed only one of these users is currently in the process of acquiring and installing the device type indicated by the service provider, e.g. the heart monitor or the alarm button. The ACS provider can derive the identification of the RG used from the message 5, and receives the device type information as part of message 5. This will match the information received in step 0, so the ACS can determine the Service Provider to use for this specific UE.

Thus, in step 8, the UE will be connected through the RG-PP to the Service Provider. For example, in case of a heart monitor, the Service Provider will want to receive specific events, e.g. in case of heart failure or other abnormalities, or in case of an alarm button if the button is pressed by the end user. The link through the RG-PP will make sure that these events are secure, or managed, meaning that for example the connection is reliable and guaranteed, that the Service Provider will receive an alarm if the connection is not available and that the Service Provider can thus take appropriate action, and that no-one can eavesdrop on this connection, ensuring the privacy of the end user.

Figure 2:
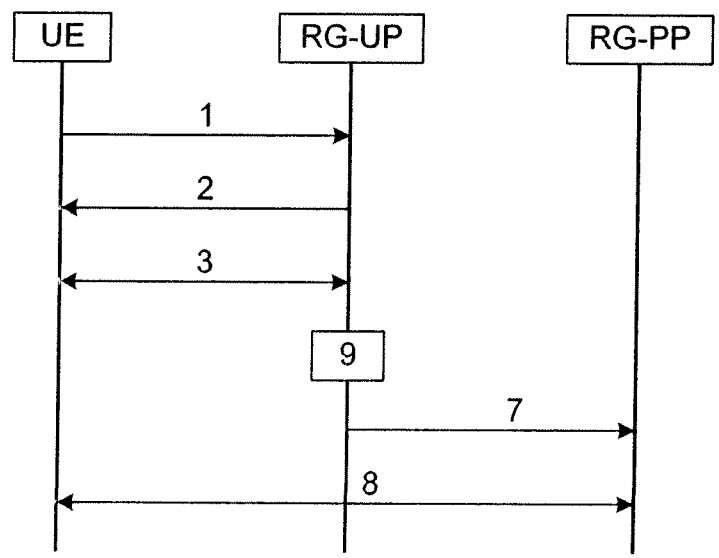
FIG. 2 schematically shows a signal flow of a method for configuring a user device within a local area network according to another embodiment of the invention.

FIG. 2 schematically shows an action flow of a method for configuring a user device within a local area network according to another embodiment of the invention.

Actions 1-3 are similar to the actions described with reference to FIG. 1. After establishment of the connection between the device UE and the gateway RG within the unprotected portion of the local area network and the transfer of the configuration request from the device UE to the gateway RG, the gateway RG now checks in action 9 whether configuration data are present within the gateway RG. Checking the presence of configuration data may be based on the device information in the configuration request. For example, the gateway RG may recognize the device type of the device or may recognize a license code.

If the gateway RG is unable to find suitable configuration data, the method for configuring the device continues along the lines set out by actions 4-8 described with reference to FIG. 1. However, if the residential gateway can identify configuration data related to the device, the gateway directly initiates the network configuration and the establishment of the connection within the protected portion of the local area network in a way similar to actions 7 and 8 described with reference to FIG. 1. The action flow shown in FIG. 2 reduces the configuration time considerably. In particular, if a device for some reason has been disconnected for a while, and then reconnects, configuring the device in accordance with the action flow shown in FIG. 2 is very useful.

The present invention which will be now illustrated with reference to FIGS. 3 and 4 by the following Examples, which should not be considered as limiting the claims.

EXAMPLES

Example 1

Figure 3:
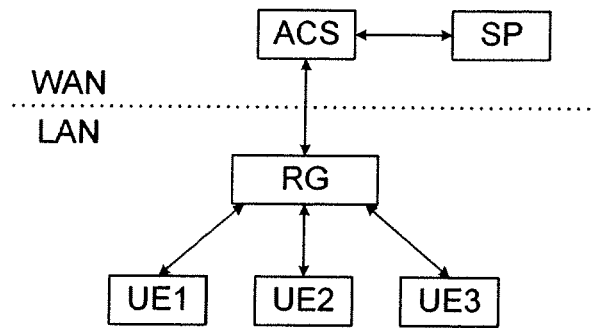
FIG. 3 schematically shows a network architecture that may be used in some embodiments of the invention.
Figure 4:
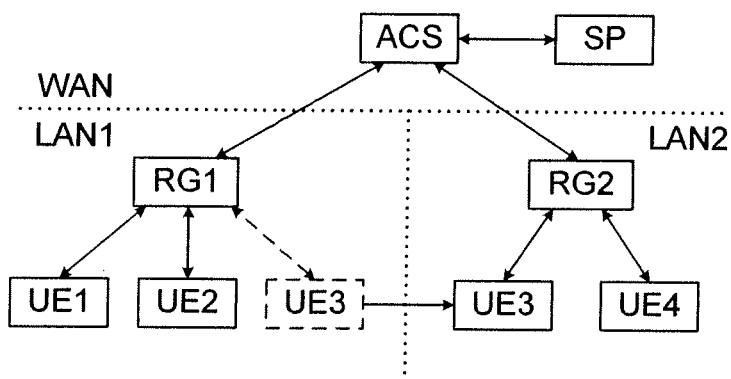
FIG. 4 schematically shows another network architecture that may be used in some embodiments of the invention.

This example illustrates the configuring of a user device UE3 introduced into a network architecture or network system as schematically shown in FIG. 3. The network architecture of FIG. 3 includes a local area network LAN and a wide area network WAN. The local area network LAN comprises a residential gateway RG for providing an interface between the two networks LAN and WAN. The wide area network WAN includes an auto-configuration server ACS and a service provider SP communicatively coupled to the server ACS. The local area network LAN initially included two user devices UE1 and UE2. The user devices UE1 and UE2 are configured and part of a protected portion of the local area network. UE3 is a user device that is added by the user associated with the residential gateway. Device UE3 is different from UE1 and UE2.

In this example user device UE3 is an alarm button, in other words an alarm device with button, i.e. a device which automatically sends an emergency signal to an emergency service if the button is pressed or otherwise activated for example by means of sensor giving a trigger for activation. Such alarm buttons may be provided by a health insurance carrier as part of a health insurance package. The health insurance carrier owns a service provider SP containing data related to the health insurance package, for example by storing an insurance code and the user thereof. The alarm button provided to the user comprises a memory in which this insurance code may be stored as well. The service provider SP may be arranged to send these data towards the ACS for provisioning purposes.

When the user activates the alarm button within his home network, i.e. local area network LAN, the alarm button obtains a connection with the gateway RG within an unprotected portion of the network LAN in a way as described with reference to FIGS. 1 and 2. In this particular case, the device information sent along with the configuration request may be a device type, i.e. an alarm button. As device UE3 is different from any of the other devices in the local area network, and is newly introduced, optional checking of the availability of configuration data as proposed in the embodiment shown in FIG. 2 will give a negative result. The appended configuration request received by the ACS pursuant to the method described with reference to FIG. 1 now includes the device type and the user. The ACS recognizes that the user and the device type correspond to a service that is provided by service provider SP. If the configuration data related to this service are provisioned in the ACS, the ACS may transfer these data towards the gateway RG in a response. If no provisioning has taken place, the ACS contacts the SP for such configuration data. Based on the configuration data received from the ACS, the gateway establishes the connection within the protected portion of the network LAN.

Example 2

In example 2, user device UE3 is again an alarm button. In this case, the device UE3 is part of the configuration of the local area network LAN as depicted in FIG. 3. However, the device has been temporarily disconnected and is now re-introduced within the network LAN. In contrast to the situation described in Example 1, checking of availability of configuration data by the gateway RG now reveals that they are available. As a result, establishing a connection within the protected portion of the network can be done within the local area network without communication with the server ACS.

Example 3

Temporarily disconnecting from the local area network as discussed in Example 2 may occur if the user takes the alarm button with him, for example during a visit to his neighbor. Such situation is schematically shown in FIG. 4. FIG. 4 shows a network architecture comprising two local area networks, a first network LAN1 and a second network LAN2. The first network LAN1 corresponds to the network LAN shown in FIG. 3. The second network LAN2 comprises a user device UE4 different from the alarm button UE3. The networks comprise a gateway RG1, RG2 respectively. Both gateways RG1, RG2 are communicatively coupled to the auto-configuration server ACS in the wide area network WAN.

When the user carrying the alarm button UE3 is introduced in the second network LAN2. The procedure as set out in FIG. 1 and discussed in Example 1 may be followed to establish a connection between the gateway RG2 and the alarm button UE3. In this case, the device information in the configuration request should include information that can unambiguously link the user to the device. In this case, the device information may include the insurance code. The gateway RG2 forwards the device information as well as the user-information related to gateway RG2 to the auto-configuration server. The gateway RG2 may furthermore append network information related to the second network LAN2. The ACS may now recognize that the alarm button UE3 is roaming within LAN2 and may realize that linking the user to the device should be based on different data, for example the insurance code. The ACS may then be able to retrieve the relevant configuration data on the basis of the insurance code, and sends the configuration data to the gateway RG2 in the second network LAN2. The gateway RG2 can now finalize the network configuration and establish the connection with the device UE3 within the protected portion of the second network LAN2.

The residential gateway RG may be implemented as a computer system comprising a processor with peripherals. The processor may be connected with one or more memory units which are arranged for storing instructions and data, one or more reading units, one or more input devices, such as a keyboard, touch screen, or mouse, and one or more output devices, for example a monitor. Further, a network Input/Output (I/O) device may be provided for a connection to the networks.

The processor may comprise several processing units functioning in parallel or controlled by one main processor, that may be located remotely from one another, possibly distributed over the local area network, as is known to persons skilled in the art. The functionality of the present invention may be accomplished by a combination of hardware and software components. Hardware components, either analogue or digital, may be present within the processor or may be present as separate circuits which are interfaced with the processor. Further it will be appreciated by persons skilled in the art that software components that are executable by the processor may be present in a memory region of the processor. Embodiments of the method may be stored on a computer readable medium, for example a DVD or USB-stick, for performing, when executed by the processor, embodiments of a method for configuring a user device in a local area network. The stored data may take the form of a computer program, which computer program is programmed to implement an embodiment of the method when executed by the computer system after loading the computer program from the computer readable medium into the computer system.

The invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention, which is defined in the accompanying claims.

ABBREVIATIONS

ACS: Auto-Configuration Server
DHCP: Dynamic Host Configuration Protocol
DVD: Digital Video Disc
IP: Internet Protocol
LAN: Local Area Network
MAC: Medium Access Control
PP: Protected Portion
RG: Residential Gateway
UE: User Equipment
UP: Unprotected Portion
UPnP: Universal Plug and Play
URL: Uniform Resource Locator
USB: Universal Serial Bus
VLAN: Virtual Local Area Network
WAN: Wide Area Network

The invention claimed is:

1. A method for configuring a device in a local area network using a gateway, the gateway being communicatively coupled to a remote management server outside the local area network, the local area network comprising a protected portion and an unprotected portion, the method comprising:
(a) at the gateway, receiving a connection request from a user device;
(b) providing an address to the user device, the address enabling the user device to establish a connection with the gateway within the unprotected portion of the local area network;
(c) at the gateway, receiving a configuration request from the user device, the configuration request comprising device information, wherein the device information identifies the type of user device;
(d) appending network information to the configuration request and sending the appended configuration request to the remote management server, wherein the network information is based on analysis of the device information;
(e) receiving a configuration response message comprising configuration data from the remote management server, wherein the configuration data is based on the device information in and the network information appended to the configuration request; and
(f) establishing configuration of the user device within the protected portion of the local area network on the basis of the configuration data.

2. The method of claim 1, wherein the method, after receiving the configuration request in step (c), further comprises the step of checking whether configuration data are available within the gateway, and if such data are available, directly proceeding to step (f).

3. The method of claim 1, wherein the method further comprises providing computer executable information to the user device for performing one or more services.

4. The method of claim 3, wherein the computer executable information is provided on the basis of the device information in the configuration request.

5. The method of claim 3, wherein the computer executable information is provided after the establishing in step (f) in response to a service request received from the user device.

6. The method of claim 1, wherein the method further comprises providing an identification code to the user device.

7. The method of claim 6, wherein the identification code is received from the remote management server in addition to the configuration data.

8. The method of claim 1, wherein the method after establishing configuration of the user device in step (f) further comprises disconnecting the connection between the user device and the gateway within the unprotected portion of the local area network.

9. A non-transitory computer readable medium having instructions stored thereon that, when executed by a processor of a gateway, cause the gateway to carry out operations including:
(a) receiving a connection request from a user device in a local area network having a protected portion and an unprotected portion;
(b) providing an address to the user device, the address enabling the user device to establish a connection with the gateway within the unprotected portion of the local area network;
(c) receiving a configuration request from the user device, the configuration request comprising device information, wherein the device information identifies the type of user device;
(d) appending network information to the configuration request and sending the appended configuration request to a remote management server outside of the local area network, wherein the network information is based on analysis of the device information;
(e) receiving a configuration response message comprising configuration data from the remote management server, wherein the configuration data is based on the device information in and the network information appended to the configuration request; and (f) establishing configuration of the user device within the protected portion of the local area network on the basis of the configuration data.

10. A gateway device for configuring a user device in a local area network, the local area network having a protected portion and an unprotected portion, wherein the gateway device is communicatively coupled to a remote management server outside the local area network, the gateway device comprising:
   a processor;
   memory accessible by the processor; and
   instructions stored in the memory that, when executed by the processor, cause the gateway device to carry out operations including:
   (a) receiving a connection request from a user device;
   (b) providing an address to the user device, the address enabling the user device to establish a connection with the gateway within the unprotected portion of the local area network;
   (c) receiving a configuration request from the user device, the configuration request comprising device information, wherein the device information identifies the type of user device;
   (d) appending network information to the configuration request and sending the appended configuration request to the remote management server, wherein the network information is based on analysis of the device information;
   (e) receiving a configuration response message comprising configuration data from the remote management server, wherein the configuration data is based on the device information in and the network information appended to the configuration request; and
   (f) establishing configuration of the user device within the protected portion of the local area network on the basis of the configuration data.

11. A network system for configuring a user device comprising:
   a local area network having a protected portion and an unprotected portion and comprising the user device;
   a wide area network comprising a remote management server for providing configuration data; and
   a gateway device for providing an interface between the local area network and the wide area network, the gateway comprising a processor, memory accessible by the processor, and instructions stored in the memory that, when executed by the processor, cause the gateway device to carry out operations including:
   (a) receiving a connection request from the user device;
   (b) providing an address to the user device, the address enabling the user device to establish a connection with the gateway within the unprotected portion of the local area network;
   (c) receiving a configuration request from the user device, the configuration request comprising device information, wherein the device information identifies the type of user device;
   (d) appending network information to the configuration request and sending the appended configuration request to the remote management server, wherein the network information is based on analysis of the device information;
   (e) receiving a configuration response message comprising configuration data from the remote management server, the configuration data being for configuring the user device, wherein the configuration data is based on the device information in and the network information appended to the configuration request; and
   (f) establishing configuration of the user device within the protected portion of the local area network on the basis of the configuration data.

12. The network system of claim 11, wherein the wide area network further comprises a service provider, wherein the service provider is communicatively coupled to the remote management server, and wherein the service provider is arranged for provisioning the remote management server with configuration data related to the user device to be configured.

13. The network system of claim 11, wherein the network system further comprises a further local area network comprising a further gateway device, wherein the further gateway device is configured for carrying out operations in accordance with those of the gateway device.

\* \* \* \* \*